United States Patent
Desai et al.

(10) Patent No.: US 8,723,729 B2
(45) Date of Patent: May 13, 2014

(54) ANGLE OF ARRIVAL AND/OR RANGE ESTIMATION WITHIN A WIRELESS COMMUNICATION DEVICE

(75) Inventors: Prasanna Desai, Elfin Forest, CA (US); Brima B. Ibrahim, Aliso Viejo, CA (US); Siukai Mak, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 539 days.

(21) Appl. No.: 12/787,256

(22) Filed: May 25, 2010

(65) Prior Publication Data
US 2010/0302102 A1  Dec. 2, 2010

Related U.S. Application Data

(60) Provisional application No. 61/181,272, filed on May 26, 2009.

(51) Int. Cl.
*G01S 5/04*  (2006.01)

(52) U.S. Cl.
USPC .......................................................... 342/433

(58) Field of Classification Search
USPC .......................................................... 342/433
See application file for complete search history.

(56) References Cited

U.S. PATENT DOCUMENTS

| | | | | | |
|---|---|---|---|---|---|
| 3,430,243 | A | * | 2/1969 | Evans | 342/465 |
| 4,041,494 | A | * | 8/1977 | Ewen et al. | 342/458 |
| 4,920,348 | A | * | 4/1990 | Baghdady | 342/433 |
| 4,978,963 | A | * | 12/1990 | Thorpe | 342/433 |
| 5,710,548 | A | * | 1/1998 | LeMense | 340/12.22 |
| 6,271,791 | B1 | * | 8/2001 | Bruzzone | 342/442 |
| 6,646,601 | B2 | * | 11/2003 | Samson et al. | 342/418 |
| 2001/0031648 | A1 | * | 10/2001 | Proctor et al. | 455/562 |
| 2002/0160840 | A1 | * | 10/2002 | Morkris et al. | 463/51 |
| 2004/0178955 | A1 | * | 9/2004 | Menache et al. | 342/463 |
| 2004/0203872 | A1 | * | 10/2004 | Bajikar | 455/456.1 |

* cited by examiner

*Primary Examiner* — Harry Liu
(74) *Attorney, Agent, or Firm* — Garlick & Markison; Shayne X. Short

(57) ABSTRACT

Angle of arrival and/or range estimation within a wireless communication device. Appropriate processing of communications received by a wireless communication device is performed to determine the angle of arrival of the communication (e.g., with respect to some coordinate basis of the wireless communication device). Also, appropriate processing of the communications may be performed in accordance with range estimation as performed by the wireless communication device to determine the distance between the transmitting and receiving wireless communication devices. There are two separate modes of packet processing operations that may be performed: (1) when contents of the received packet are known, and (2) when contents of the received packet are unknown. The wireless communication device includes a number of antenna, and a switching mechanism switches from among the various antennae capitalizing on the spatial diversity of the antennae to generate a multi-antenna signal.

20 Claims, 8 Drawing Sheets

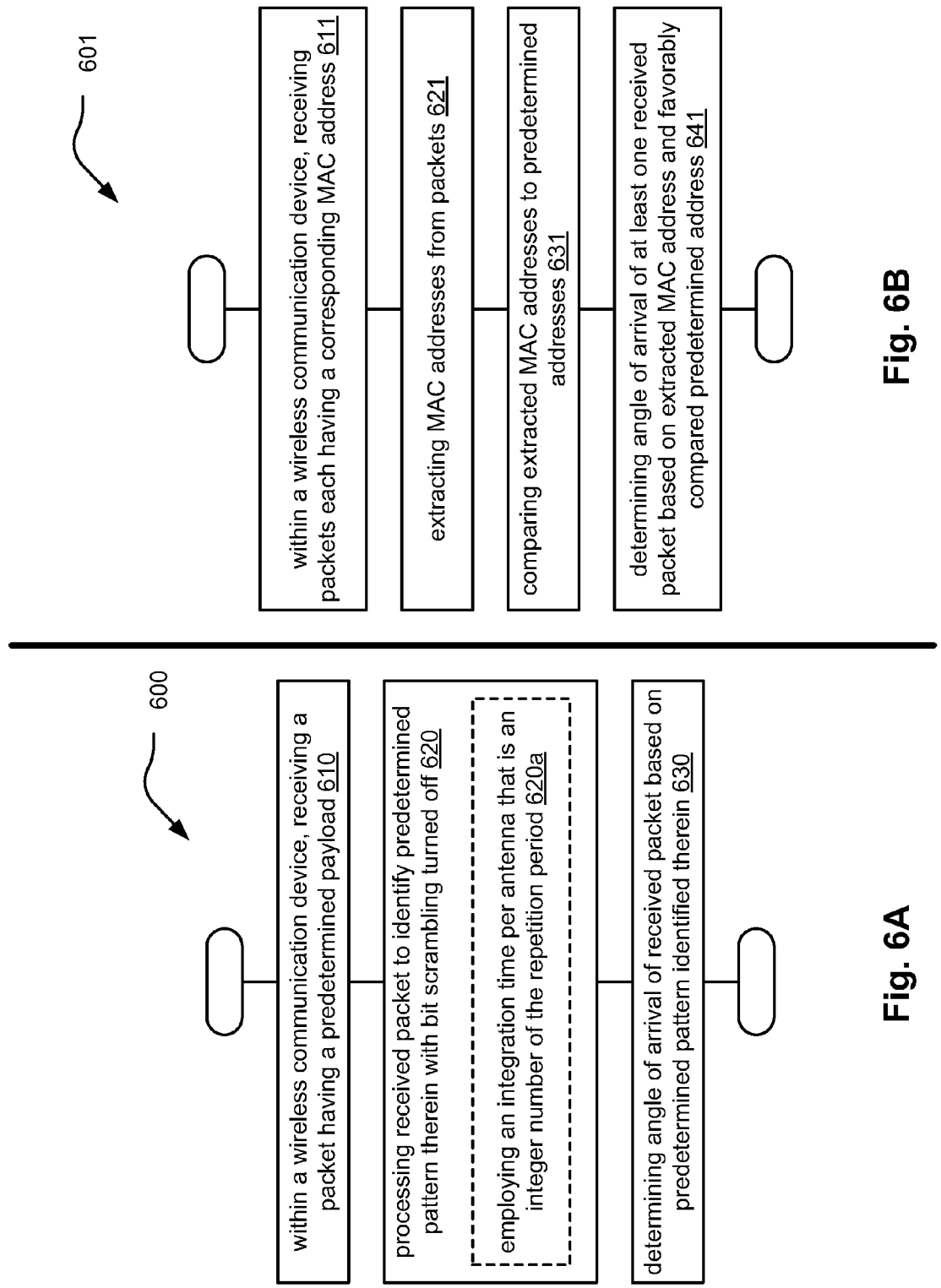

ANGLE OF ARRIVAL AND/OR RANGE ESTIMATION WITHIN A WIRELESS COMMUNICATION DEVICE

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 61/181,272, entitled "Angle of arrival and/or range estimation within a wireless communication device," filed 05-26-2009.

BACKGROUND OF THE INVENTION

1. Technical Field of the Invention

The invention relates generally to wireless communication devices; and, more particularly, it relates to means for determining an angle of arrival of a transmission received by a wireless communication device and/or range estimation (between two wireless communication devices) as performed by the wireless communication device.

2. Description of Related Art

Communication systems, including data communication systems, have been under continual development for many years. In some communication systems, there is a desire to determine the directionality of communications transmitted from one communication device to another. Moreover, range estimation (e.g., including an estimate of the distance between two communication devices) is also desirable in some applications. The current means in the art that attempt to deal with such issues do not provide adequate solutions in terms of a variety of concerns, including cost effectiveness, accuracy, etc.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 1 illustrates an embodiment of the relationship between two wireless communication devices in terms of angle of arrival and/or range estimation there between.

FIG. 5A, FIG. 5B, FIG. 6A, FIG. 6B, FIG. 7A, FIG. 7B, and FIG. 8 illustrate various embodiments of methods that may be performed within a wireless communication device to perform angle of arrival and/or range estimation.

DETAILED DESCRIPTION OF THE INVENTION

As mentioned above, there are a variety of applications in which angle of arrival and/or range estimation, as between two communication devices is desirable (and in particular, between wireless communication devices).

Figure 1:
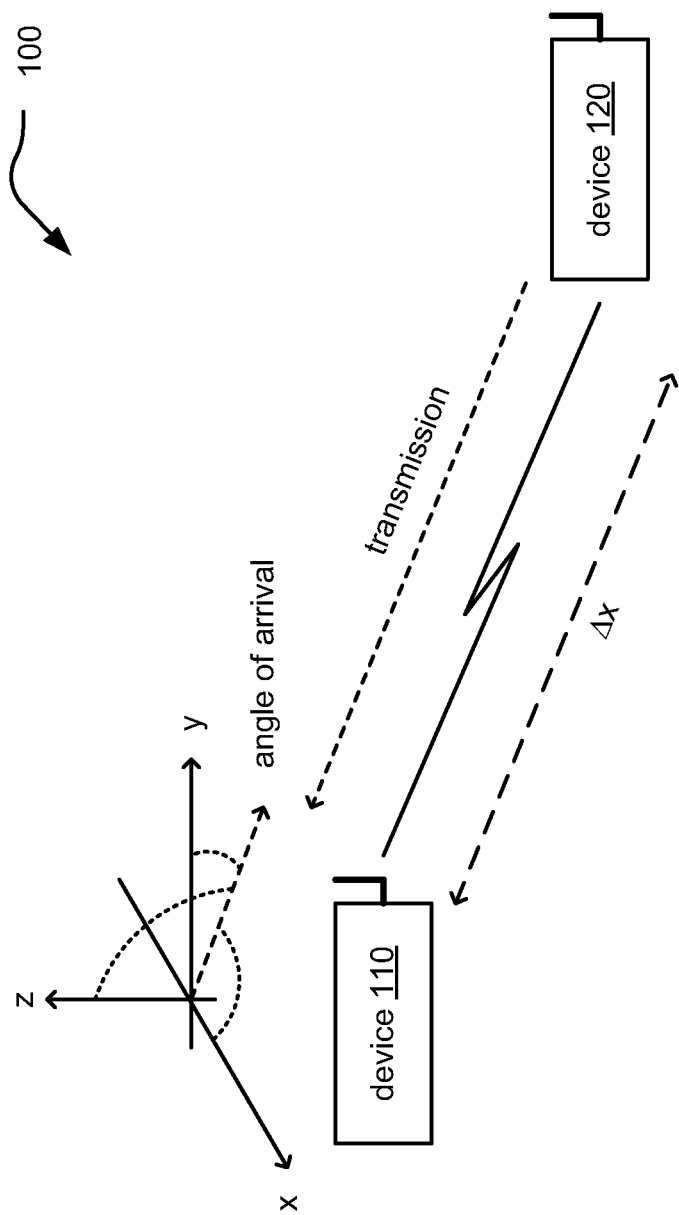

FIG. 1 illustrates an embodiment 100 of the relationship between two wireless communication devices in terms of angle of arrival and/or range estimation there between. Consider two wireless communication devices 110 and 120 separated by some distance and having some orientation with respect to one another.

As a communication is transmitted from wireless communication device 120 to wireless communication device 110, the communication or received signal will arrive at wireless communication device 110 at a particular angle (as defined with respect to some reference of the wireless communication device 110). Any of a number of desired coordinate systems may be employed to reference the angle of arrival. Some examples include vector or Cartesian coordinates (x, y, z), spherical coordinates ($\rho$, $\theta$, $\phi$), or cylindrical coordinates (r, $\phi$, z), etc. In addition, the distance ($\Delta x$) between the two wireless communication devices 110, 120 may be estimated based on ranging operations.

FIG. 2A, FIG. 2B, FIG. 2C, FIG. 2D, FIG. 2E, and FIG. 2F illustrate various embodiments 201, 202, 203, 204, 205, and 206, of applications that may employ angle of arrival and/or range estimation functionality. There are a number of applications in which such functionality may be desirable. Some examples are described in these diagrams.

Figure 2:
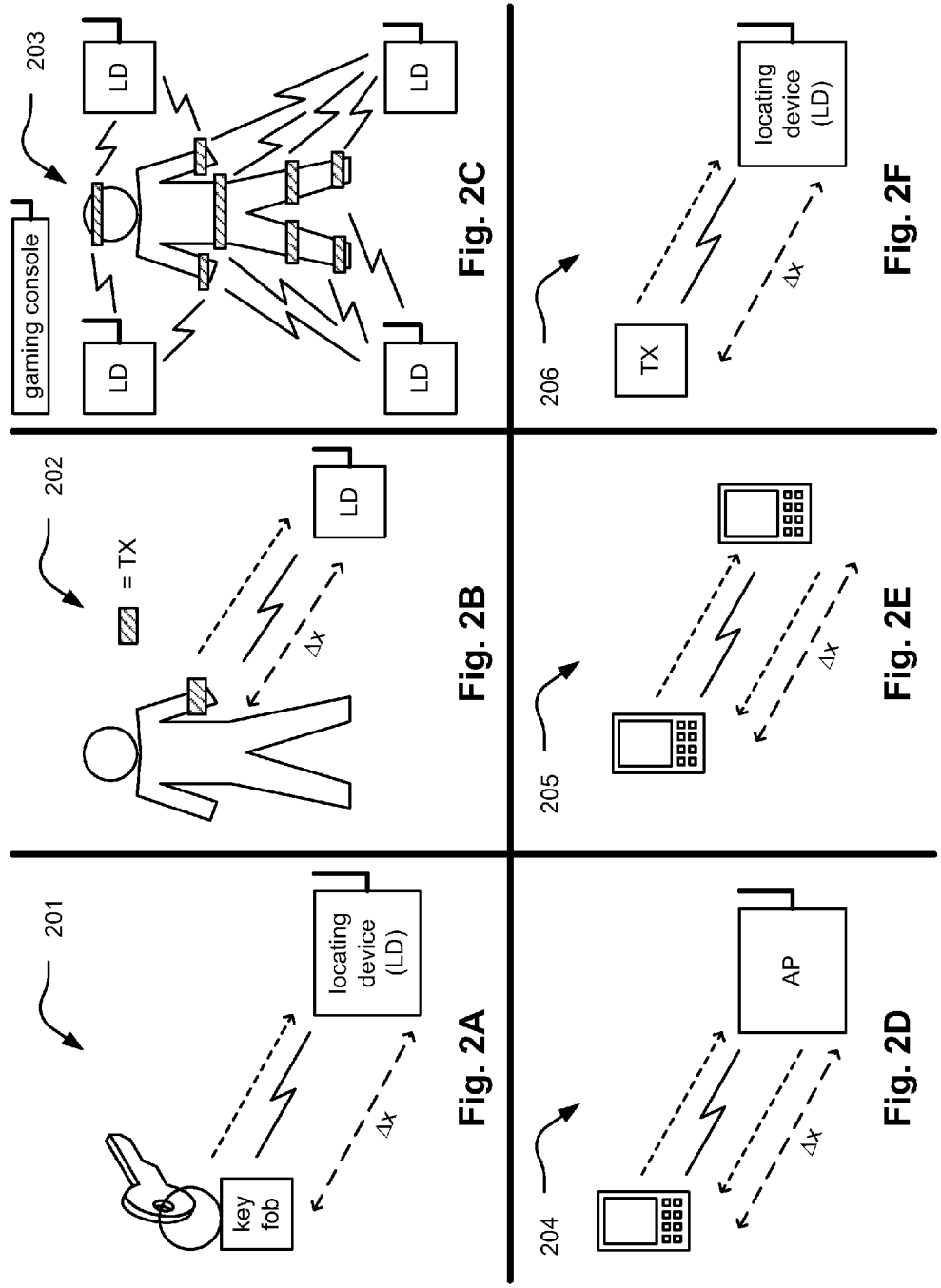
FIG. 2A, FIG. 2B, FIG. 2C, FIG. 2D, FIG. 2E, and FIG. 2F illustrate various embodiments of applications that may employ angle of arrival and/or range estimation functionality.

Referring to embodiment 201 of FIG. 2A, a transmitting device may be implemented within a key fob to assist in the locating of a person's key chain. For example, a key fob may be implemented as having some wireless communication means (e.g., a Bluetooth low energy (BLE)-enabled key fob). Via user input, a locating device (e.g., a cell phone, or other wireless communication device that is shown generically as LD) commences BLE scanning for non-connectable advertising packets from the fob. The angle of arrival is estimated at the locating device via processing the packets transmitted there from. The locating device may be designed to display a flashing arrow indicating the direction in which the fey fob is located. Moreover, ranging operations may also be employed to display the distance between the locating device and the key fob.

Referring to embodiment 202 of FIG. 2B, a transmitting device may be placed on a person (e.g., as a wristband, or placed somewhere else on a person [on a belt, a shoe, a piece of jewelry, etc.]). Such a transmitting device (shown generically as TX) transmits communications that are received by a locating device. Considering applications such as monitoring the location of children or elderly patients wearing such transmit capable device (e.g., a BLE- or Bluetooth's basic range/enhanced data rate (BR/EDR)-enabled wrist band). It is noted that, within this and any embodiment described herein, may employ signals having characteristics being compliant with Bluetooth low energy (BLE), Bluetooth basic range/enhanced data rate (BR/EDR), or Institute of Electrical and Electronics Engineers (IEEE) 802.11 (including any such standards and/or recommended practices thereof). Generally speaking, signals comporting with any particular protocol, format, standard, recommended practice, proprietary implementation, etc. may be employed without departing from the scope and spirit of the invention.

The LD (e.g., phone or some other central device) establishes a connection with multiple wrist-bands. The LD may be implemented to display the approximate direction (from angle or arrival determination) and distance (from ranging operations) from the central device of all the remote devices. An alert may be sounded if the user strays too far away and the direction indication helps locate the person quickly.

Referring to embodiment 203 of FIG. 2C, a number of transmitting devices (TXs) may be placed on various locations of a person to track the bodily movement of the person; such tracking of the relative movement of a person (e.g., relative movement of legs with respect to torso, relative movement of arms with respect to legs, of generally relative movement of a first portion of a person's body to a second portion of a person's body, etc.) may be desirable in certain applications such as video gaming applications. A gaming console may be implemented to keep track of player movements (including relative bodily movements) and position via angle of arrival positioning technology. In one embodiment, the gaming console may have separate BR access control list (ACL) connections with up to predetermined number of game controllers (e.g., 4 game controllers). The console polls each of the controllers every predetermined number of seconds (e.g., every 5 ms). Button-push information may be sent by the controllers to the gaming console in the single-slot ACL packet payload. The console sends rumble or LED flashing feedback payload to the controllers in its "poll", which is actually a DM1 packet, else an empty POLL packet suffices.

Referring to embodiment 204 of FIG. 2D, the angle of arrival of communications and/or range estimation may be made with respect to communications made between a wireless communication device and a wireless local area network (WLAN/WiFi) access point (AP) may be made. In some instances, the locations of various APs within a communication system are already known. Such locations may have been determined beforehand (e.g., determined off-line, using global positioning system (GPS) functionality within one or more of the APs, etc.).

For example, if the AP's position coordinates are known, a wireless communication device (e.g., a smartphone) can estimate its location relative to the AP and provide a collocated global positioning system (GPS) receiver with coarse location assistance in order to shorten the GPS receiver's time to fix first (TTFF) (i.e., A-GPS). Accuracy would be improved via triangulation if more AP's are visible. The AP's media access control (MAC) address information could be extracted from the IEEE 802.11 beacons broadcast by the AP every approximately 100 ms. The angle of arrival estimate, coupled with the received signal strength indication (RSSI) estimate (RSSI is used to compute path loss and from the path loss you can figure out the distance between the AP and wireless station (STA), since to minimize the hidden-node problem, WiFi devices transmit at fixed TX power levels) helps refine the accuracy of the wireless communication device's (e.g., smartphone's) coordinates.

Referring to embodiment 205 of FIG. 2E, angle of arrival of communications and/or range estimation may be made with respect to communications made between two wireless communication devices may be made. For example, such an embodiment may include bi-directional communication between two wireless communication devices. Any of a wide variety of wireless communication devices may be implemented to include such functionality as described herein for determining an angle of arrival corresponding to the signal transmitted from a first wireless communication device and/ or a range estimate corresponding to a distance between the first wireless communication device and a second wireless communication device.

Referring to embodiment 206 of FIG. 2F, generally speaking, angle of arrival of communications and/or range estimation may be made with respect to communications made between a transmitting device and a locating device. For example, such an embodiment includes uni-directional communication between the transmitting device and the locating device. For example, communications may only be provided from the transmitting device to the locating device, in that, the transmitting device need not necessarily include functionality for determining an angle of arrival corresponding to the signal transmitted from the transmitting device and/or a range estimate corresponding to a distance between the transmitting device and the locating device.

Figure 3:
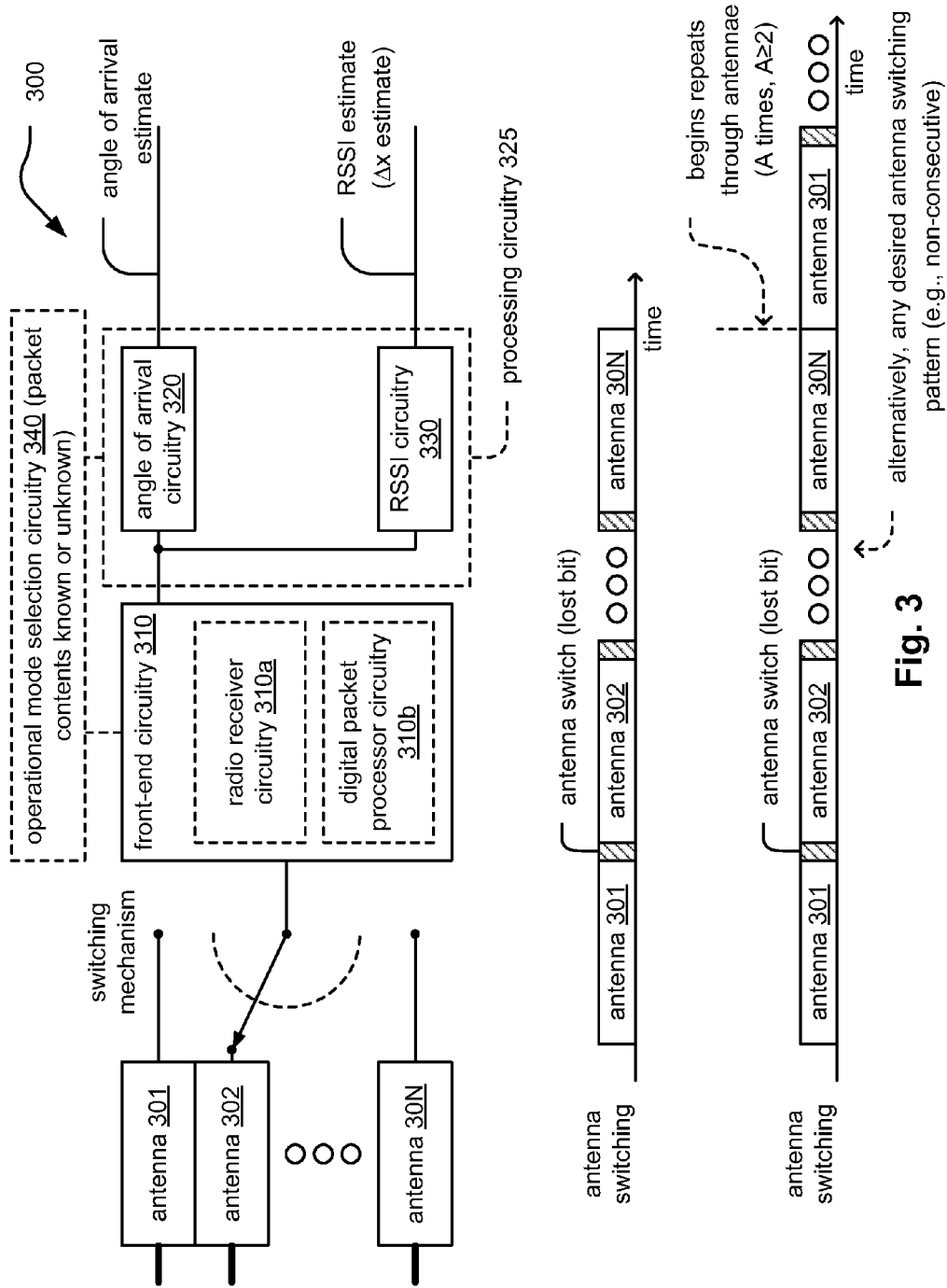
FIG. 3 illustrates an embodiment of a communication device that is operative to perform angle of arrival and/or range estimation using received communications.

FIG. 3 illustrates an embodiment 300 of a communication device that is operative to perform angle of arrival and/or range estimation using received communications. In this diagram, the embodiment 300 shows a receiver (which may be implemented within a transceiver communication device) that is capable of performing both angle of arrival and ranging estimation (e.g., as may be performed in accordance with RSSI measures). The embodiment 300 includes of a receiver having multi-antennae front-end (shown as antenna 301, antenna 302, and up to antenna 30N). There from, a single receive radio path can connect to each of individual antennae 301-30N via a multi-pole switch.

Within the duration of a single received frame (packet), the receiver dwells on each antenna for a short duration of time and then switches to the subsequent antenna to collect another set of contiguous signal samples and so on until data is collected over all the used antennae. Generally, the amount of time spent on each particular antenna in the group is approximately the same. However, the amount of time respective spent on each of the various antennae need not necessarily be the same. The amount of time spent on each antenna may be adjusted adaptively in response to any number of factors.

Each bit associated with the antenna switch instant (between 2 of the antennae) is "lost"; it is unusable for demodulation purposes due to the unknown phase discontinuity introduced by switching. The problem may be exacerbated for differentially coded modulations. The angle of arrival and/or range estimation approaches presented herein work best when the packet contents used for estimation purposes are known 'a priori' (i.e., beforehand) at the receiver, but it is not required. Two operational modes are presented herein: (1) in which the contents of the received packet are known, or (2) when contents of the received packet are unknown.

The packet processing means presented herein allow for the recovery of information bits "lost" during the antenna switching procedure, by exploiting certain redundancies.

It is noted that the accuracy of the angle of arrival and/or range estimation certainly improves when and with certain conditions being met, such as: SNR of received communication is high, communication channel dispersion is low, the receiver dwells on each antenna for a relatively longer duration (e.g., SNR of the angle of arrival and/or range estimate improves with a larger number of samples collected), when the pattern of bits upon which estimation is done using the multiple antennae is a pattern known 'a priori' (i.e., beforehand) at the receiver versus blind estimation techniques. Also, assuming a stationary remote device, the accuracy is improved when several successive packets are processed for purposes of angle of arrival and/or range estimation, since averaging would improve the accuracy of the estimate (i.e.

LPF). Also, the accuracy will also improve for a wireless communication device that includes a larger number of antennae.

Referring again to the embodiment 300 of FIG. 3, from the multi-pole switch, the signal is provided to a front-end circuitry 310. The front-end circuitry 310 may include separately partitioned radio receiver circuitry 310a and digital packet processor circuitry 310b. The radio receiver circuitry 310a may include any necessary functionality to perform processing of a continuous time signal thereby generating a discrete time signal (e.g., a digital signal). Such radio processing functions may include digital sampling (e.g., using an analog to digital converter (ADC)), filtering (digital and/or analog), frequency shifting and/or conversion, scaling, etc. The digital packet processing circuitry 310b may be implemented for identifying repetition coded bits within the digital signal and for directing the switching mechanism to switch between two of the plurality of antennae during a selected bit within the repetition coded bits. For example, as described with respect to FIG. 4, the characteristics of repetition coding may be exploited to perform switching between two different antennae during a time associated with a particular bit within the repetition coded bits.

In even other embodiments, the digital packet processing circuitry 310b may be implemented for using the digital signal for identifying a media access control (MAC) address corresponding to the communication device from which the signal is being transmitted. For example, certain communications from a communication device include a MAC address, and the MAC address (once extracted) may be associated with a communication device whose location is known. Of course, the MAC address may be looked up within a list that includes known locations of such communication devices (such list may be available locally or accessible via a remote location, such as via the Internet or via some communication link). For example, a communication device that includes such functionality as described herein may operate by associating the MAC address with a predetermined location corresponding to the transmitting communication device. The communication device then may estimate a position of itself, relative to the transmitting communication device, based on the predetermined location corresponding to the transmitting communication device.

An output signal (e.g., a digital signal) from the front-end circuitry 310 is provided to a processing circuitry 325. The processing circuitry 325 is operative for processing the digital signal thereby generating an estimate of an angle of arrival corresponding to the signal transmitted from the transmitting communication device and/or a range estimate corresponding to a distance between the communication device and the transmitting communication device.

In some embodiments, the processing circuitry 325 may include both an angle of arrival circuitry 320 and a received signal strength indication (RSSI) circuitry 330. In such embodiments, the angle of arrival circuitry 320 is operative to calculate an estimate of the angle of arrival of a communication received by the communication device. The RSSI circuitry 330 is operative to calculate an estimate of the RSSI of a communication received by the communication device. In other words, separate and distinct circuitries may be implemented within the processing circuitry 325 for performing various functions therein.

Moreover, as mentioned above, there are at least 2 operational modes in which the processing herein may be performed: (1) in which the contents of the received packet are known (e.g., predetermined), or (2) when contents of the received packet are unknown. As such, an operational mode selection circuitry 340 is operative to provide one or more control signals to each of the front-end circuitry 310, the angle of arrival circuitry 320, and the RSSI circuitry 330. Such an operational mode selection circuitry 340 may be operative for adaptively directing operation of the front-end circuitry 310 and the processing circuitry 325 (or particularly the angle of arrival circuitry 320 and RSSI circuitry 330 in some embodiments) in accordance with a first operational mode corresponding to the signal including predetermined contents, and a second operational mode corresponding to the signal including unknown contents.

It is of course noted that all of the received packets need not have identical content. For example, when the contents of the received packets are predetermined, then the content of each respective received packet is known (though each packet may differ in content). For example, a sequence of packets may be repeated.

Contents of the Received Packet are Known

When the receiver does know, 'a priori', the contents of the consecutive sequence of bits (or more broadly, symbols) used for angle of arrival estimation.

When the remote wireless communication device is aware of its purpose to support angle of arrival functionality, it can use fixed, long bit patterns in its packet payload that are known 'a priori' by the wireless communication device performing the angle of arrival estimation.

For legacy wireless communication devices (that are not angle of arrival-aware type of wireless communication devices) that transmit packet types that are sufficiently long enough (e.g., for performing angle of arrival estimation) known bit pattern fields, some type of repetition coding may be performed.

As an example, an X bit (e.g., X=48) advertiser address in a Bluetooth low energy (BLE) transmission sent from a wireless communication device that the current wireless communication device is paired with. Considering 1/3 repetition code, by using 1 of the 3 repeated bits used in the 1/3 FEC repetition code in the BR/EDR packet header for antenna switching instants, the coding redundancy can be exploited to recover the bit "lost" due to antenna switching. Alternative means to regular demodulation are, however, typically still required to verify that the bits (or sequence of bits) unusable for regular demodulation purposes did, in fact, contain the expected bit patterns.

Contents of the Received Packet are Unknown

Decision-directed recovery of data may be performed. If it is a connectable device, the BR/EDR or BLE phone can force the remote device to retransmit data packets by performing negative acknowledgement (NAK'ing) the previous, correctly received packet. The wireless communication device then uses the re-transmitted packet for angle of arrival estimation, since these subsequently received packet contents were "learned" from the original transmission. This can be easily applied to use cases where angle of arrival estimation time is not very time-critical.

It is noted also that even in the video gaming use case described elsewhere herein, where latency is a critical issue, this NAK-based technique has applicability. For example, if only 2 controllers are being used, the console can NAK each and every poll to the controllers and use the re-transmitted packet exclusively for angle of arrival estimation without compromising the 5 ms latency requirement for button-push information from each controller. Even in a case of a "fully-loaded" 4 controller scenario, since the movements of a gaming player do not need to be tracked with a granularity less than a predetermined distance (e.g., of perhaps less than once per 100 ms), the angle of arrival estimation may only be performed once every 100 ms per controller. Due to human response times, the probability is very low that the player will have 'new' button press information to transmit in the very next packet 5 ms after the previous one, that would now be delayed by 5 ms due to the NAK'ing technique. One advantage of employing the NAK technique is that you get an entire packet's worth of retransmitted contents, and thus the dwell time per antenna can be much longer than when you are forced to switch antennae much sooner when one is only able to use a shorter field of known contents.

Figure 4:
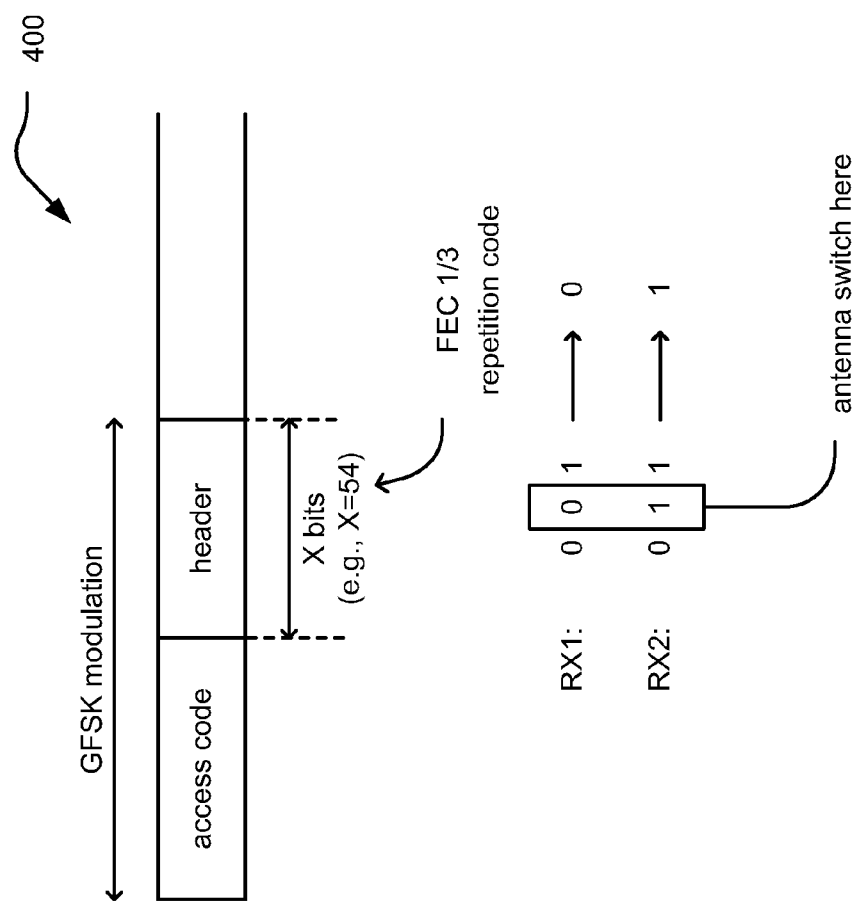
FIG. 4 illustrates an embodiment of processing of a received communication, that is generated in accordance with repetition coding, in accordance with angle of arrival and/or range estimation.

FIG. 4 illustrates an embodiment 400 of processing of a received communication, that is generated in accordance with repetition coding, in accordance with angle of arrival and/or range estimation.

Direction-finding may be performed during the BR/EDR's Page or Inquiry procedure (e.g., prior to establishing a connection GFSK modulation connection, for example, to locate a missing headset). The 1/3 FEC repetition encoding in the header may be exploited (including the FHS packet) to use 1 in every 3 header bits as reference bits with known polarity for angle or arrival estimation. This processing works with all legacy BR/EDR wireless communication devices, i.e. device being "direction-found" does not need to be angle or arrival-aware. If the other 2 bits (out of 3 coded bits) do not match in polarity, then the packet is discarded for the angle of arrival estimation purposes and the HEC error is reported.

FIG. 5A, FIG. 5B, FIG. 6A, FIG. 6B, FIG. 7A, FIG. 7B, and FIG. 8 illustrate various embodiments of methods 500, 501, 600, 601, 700, 701, and 800, that may be performed within a wireless communication device to perform angle of arrival and/or range estimation.

Figures 5A, 5B:
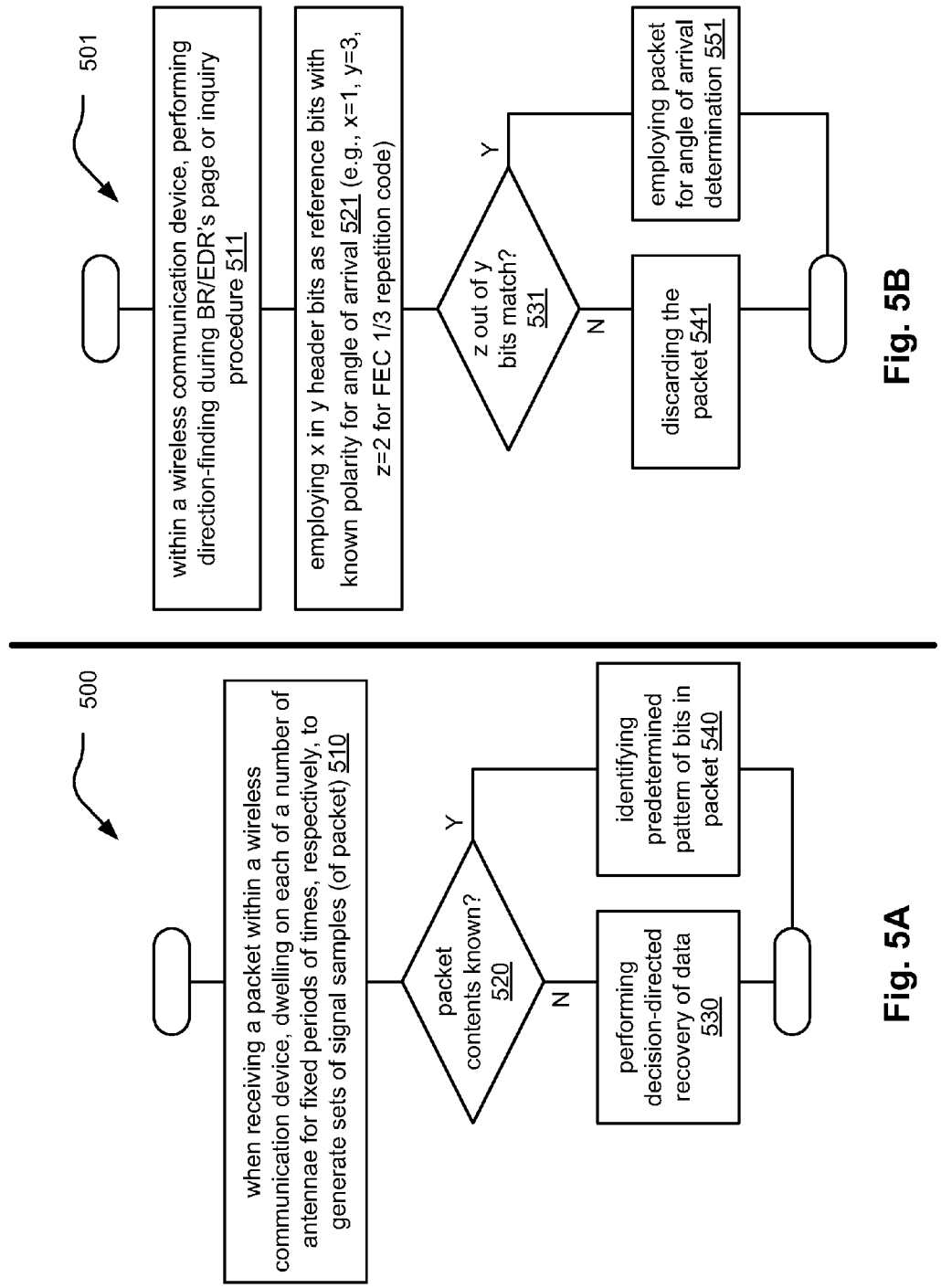

Referring to method 500 of FIG. 5A, when receiving a packet within a wireless communication device, the method 500 begins by dwelling on each of a number of antennae for fixed periods of times, respectively, to generate sets of signal samples (of packet), as shown in a block 510.

The method 500 continues by determining whether the contents of the packet are known (e.g., 'a priori') or unknown, as shown in a decision block 520. If the contents are unknown, then the method 500 operates by performing decision-directed recovery of data, as shown in a block 530.

The method 500 continues by identifying predetermined pattern of bits in packet, as shown in a block 540.

Referring to method 501 of FIG. 5B, within a wireless communication device, the method 501 begins by performing direction-finding during BR/EDR's page or inquiry procedure, as shown in a block 511. The method 501 then operates by employing x in y header bits as reference bits with known polarity for angle of arrival, as shown in a block 521. For example, when employing a such a FEC 1/3 repetition code, then x=1, y=3, z=2.

The method 501 continues by determining if z out of y bits match, as shown in a decision block 531. If the z out of y bits do match, then the method 501 operates by employing packet for angle of arrival determination, as shown in a block 551. Alternatively, if the z out of y bits do not match, the method 501 then operates by discarding the packet for the angle of arrival estimation purposes and the HEC error is reported, as shown in a block 541.

This approach applies to when an angle of arrival-aware device is implemented within a Bluetooth or low energy (LE) connection. A pre-determined, long payload is used. Bit patterns for the known payload pattern would be crafted based on the dwell time per antenna and number of antennae on the direction-finding device. For example, 1100 or 1010 or 11110000 patterns could be used. Generally speaking, the integration time per antenna should be an integer number of the repetition period, in order to avoid doing modulation index estimation. Therefore, in this general case, the remote devices are usually "angle of arrival-aware" in order to support the specific payload contents. Long known patterns (known 'a priori') in the payload allows for better estimation accuracy versus being limited to only using 48-bit MAC addresses. Whitening (i.e. bit scrambling) may be turned off in order to preserve the preferred pattern of bits best suited for the angle of arrival estimation procedures.

Referring to method 600 of FIG. 6A, within a wireless communication device, the method 600 begins by receiving a packet having a predetermined payload, as shown in a block 610. The method 600 continues by processing received packet to identify predetermined pattern therein with bit scrambling turned off, as shown in a block 620. In some embodiments, this may operate by employing an integration time per antenna that is an integer number of the repetition period, as shown in a block 620a. The method 600 then operates by determining angle of arrival of received packet based on predetermined pattern identified therein, as shown in a block 630.

The low energy (LE) advertising packets are transmitted with a known payload. In general, you want to preserve the advertiser address because you want to verify the advertiser device as the one you are interested in listening to (or connecting to) (e.g., the transmitting device a user is interested in communicating with such as a key fob). So, in this case, the angle of arrival is based on the known, long payload, just as described above with respect to the method 501.

Referring to method 601 of FIG. 6B, within a wireless communication device, the method 601 begins by receiving packets each having a corresponding MAC address, as shown in a block 611. The method 601 then operates by extracting MAC addresses from packets, as shown in a block 621.

The method 601 continues by comparing extracted MAC addresses to predetermined addresses, as shown in a block 631. The method 601 then operates by determining angle of arrival of at least one received packet based on extracted MAC address and favorably compared predetermined address, as shown in a block 641.

This operates by using the MAC address of LE Advertising Packets. In one embodiment, a long, known payload may be employed for angle of arrival estimation, as described previously. However, if an LE device is not angle of arrival-aware or if, in order to save power, the payload length is severely limited, the 48-bit Advertiser Address may be used for estimation. Using these 48 bits for angle of arrival implies that the receiver is not able to verify if the identity of the wireless communication device (i.e., advertising device) is indeed the one whose direction it wishes to find. However, there is a novel technique that may be performed using Adv Address verification. Since, from the initial pairing procedure, the address of the advertiser that the location determining wireless communication device wishes to find is a known reference value, the receiver can simply combine the received header and payload data with the 48 reference advertiser address bits and then pass through the CRC checker to verify that the CRC parity bits match those of the received packet.

Figures 7A, 7B:
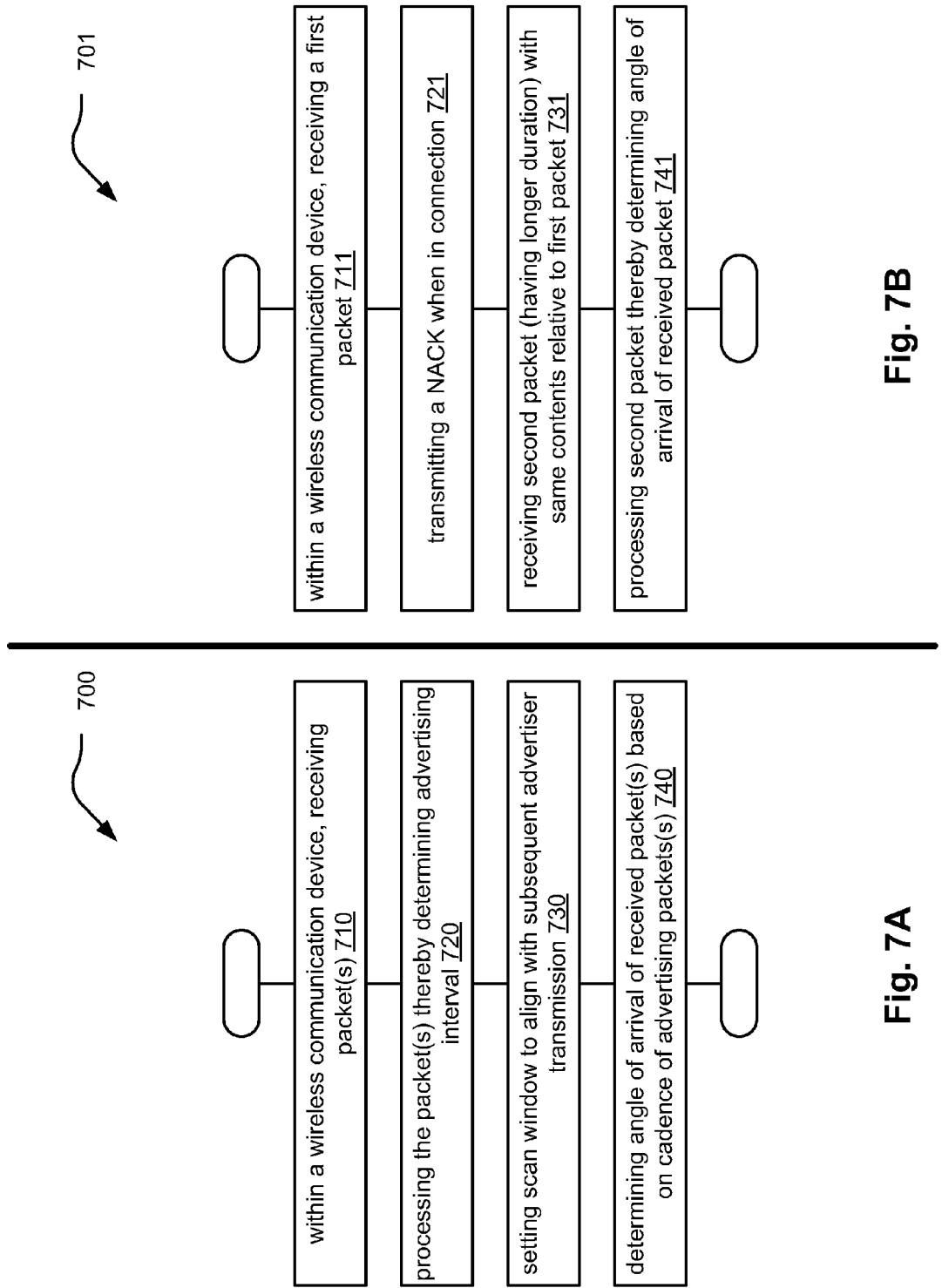

Referring to method 700 of FIG. 7A, within a wireless communication device, the method 700 begins by receiving packet(s), as shown in a block 710. The method 700 continues by processing the packet(s) thereby determining advertising interval, as shown in a block 720.

The method 700 then operates by setting scan window to align with subsequent advertiser transmission, as shown in a block 730. The method 700 continues by determining angle of arrival of received packet(s) based on cadence of advertising packets(s), as shown in a block 740.

This operates by exploiting the advertising interval of LE advertising packets. Again, this is performed by assuming that the device to be direction-found cannot use a known payload (i.e., packet contents unknown), since it is not angle of arrival-aware. The direction-finding receiver can determine the advertising interval of the advertiser (typically, a few hundred milliseconds) and set its scan window to align with a subsequent advertiser transmission. Since the contents of the advertiser packets do not change, this technique may then boil down to the known payload case (i.e., packet contents known). Sometimes the receiver may not even need to determine the advertising interval. Since the BLE specification forces the channel index=37, 38, 39, 37, 38, 39 sequential pattern for advertising, if the receiver sees the advertisement on either of the channel indices 37 or 38, it can immediately go wait for the subsequent advertisement on the next adv channel.

Referring to method 701 of FIG. 7B, the method 701 begins by within a wireless communication device, receiving a first packet, as shown in a block 711. The method 701 then operates by transmitting a NACK when in connection, as shown in a block 721.

The method 701 continues by receiving second packet (having longer duration) with same contents relative to first packet, as shown in a block 731. The method 701 then operates by processing second packet thereby determining angle of arrival of received packet, as shown in a block 741.

This operates by NAK'ing when in a connection. For both BR/EDR as well as LE, unencrypted as well as encrypted, packets are re-transmitted with identical contents relative to the original packet. A connection allows the master to poll the slave and then NAK'ing as often as desired to refine the estimation accuracy. Here too, the wireless communication device being direction-found does not need to be angle of arrival capable.

Another approach is somewhat analogous to some of the previous techniques, in that, the "advertising" interval can be determined and sections of the packet that do not change (e.g., family code) can be exploited for purposes of angle of arrival estimation.

WLAN/WiFi based LBS. With multi-antennae based angle of arrival and/or range estimation (e.g., in accordance with RSSI estimation) on the beacon frame, a more accurate estimate of the WLAN APs coordinates may be made, which would provide a better initial start for purposes of A-GPS. Otherwise, the location of a wireless communication device is known position relative to the location of an AP with a resolution of 30 meters or more (e.g., assuming a wireless communication device can only "see" or communicate with one AP and not the 3 APs needed to do the WLAN/WiFi AP triangulation that allows a user to pinpoint its location with better accuracy). This operates by using the MAC address of the beacon as the known 48 bits. For example, on the first beacon, the MAC address of the AP may be identified and then on subsequent beacons (typically 100 ms interval), perform the angle or arrival estimation. It is important also to keep in mind that, to avoid the hidden node problem in an IEEE 802.11g WLAN that does not employ power control, the AP's transmit power level is typically set to a known value (to within a few dBm), which makes the path loss estimate a meaningful one.

Yet another technique that may be performed applies to MIMO-based receivers such as IEEE 802.11n, in which multiple, parallel receive paths operate in conjunction with one another. Unlike in the case of a single radio receiver path, as is typically used for Bluetooth BR/EDR and LE devices, the MIMO-based receivers (e.g., IEEE 802.11n), may capitalize on the fact that more than one receive path is received.

Figure 8:
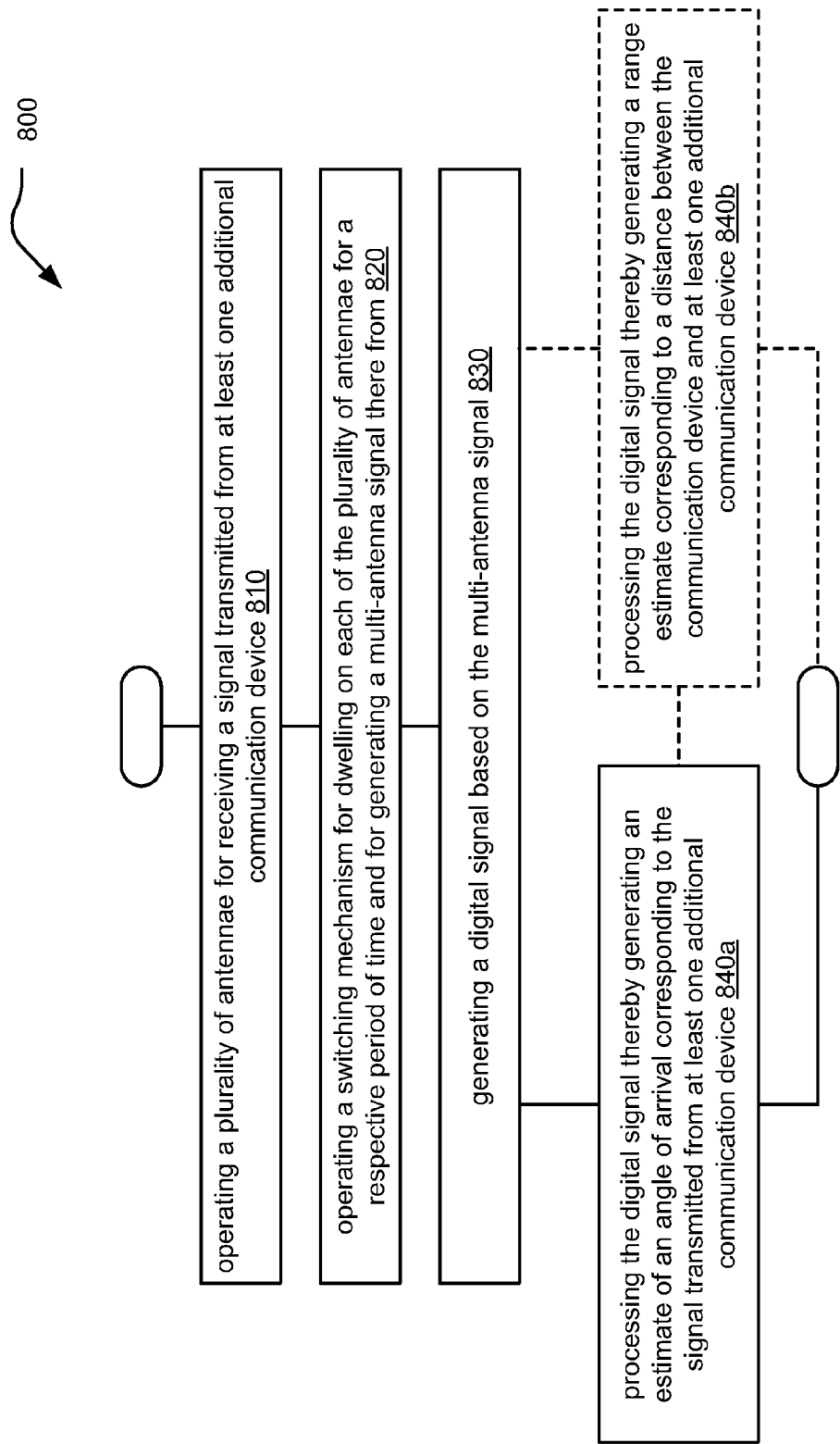

Referring to method 800 of FIG. 8, the method 800 begins by operating a plurality of antennae for receiving a signal transmitted from at least one additional communication device, as shown in a block 810. The method 800 continues by operating a switching mechanism for dwelling on each of the plurality of antennae for a respective period of time and for generating a multi-antenna signal there from, as shown in a block 820. For example, this may operate be dwelling on each particular antenna for a respective period of time. The method 800 then operates by generating a digital signal based on the multi-antenna signal, as shown in a block 830.

The method 800 may then continue any of various approaches. For example, the method 800 may continue by processing the digital signal thereby generating an estimate of an angle of arrival corresponding to the signal transmitted from at least one additional communication device, as shown in a block 840a. Alternatively, the method 800 may operate by estimating a range estimate corresponding to a distance between the communication device and at least one additional communication device, as shown in a block 840b. In certain embodiments of the method 800, the operations of both the blocks 840a and 840b may be performed.

It is noted that the various modules and/or circuitries (e.g., front-end circuitries, operational mode selection circuitries, processing circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

What is claimed is:

1. An apparatus, comprising:
a plurality of antennae to receive a signal transmitted from at least one additional apparatus;
a switching mechanism to dwell on each of the plurality of antennae for a respective period of time and to generate a multi-antenna signal there from;
a front-end circuitry, coupled to the switching mechanism, to generate a digital signal based on the multi-antenna signal;
a processing circuitry, coupled to the front-end circuitry, to process the digital signal, in accordance with at least one operational mode, selected from a plurality of operational modes based on at least one characteristic of the signal, to generate at least one of an estimate of an angle of arrival corresponding to the signal transmitted from at least one additional apparatus and a range estimate corresponding to a distance between the apparatus and the at least one additional apparatus; and
an operational mode selection circuitry adaptively to direct operation of the front-end circuitry and the processing circuitry in accordance with a first of the plurality of operational modes and a second of the plurality of operational modes; and wherein:
the first of the plurality of operational modes corresponding to the signal including predetermined contents; and
the second of the plurality of operational modes corresponding to the signal including unknown contents.

2. The apparatus of claim 1, the front-end circuitry comprising:
a digital packet processing circuitry to identify repetition coded bits within the digital signal and to direct the switching mechanism to switch between two of the plurality of antennae during a selected bit within the repetition coded bits.

3. The apparatus of claim 1, the front-end circuitry comprising:
a digital packet processing circuitry to use the digital signal to identify a media access control (MAC) address corresponding to the at least one additional apparatus.

4. The apparatus of claim 3, wherein:
the apparatus to associate the MAC address with a predetermined location corresponding to the at least one additional apparatus; and
the apparatus to estimate a position of the apparatus, relative to the at least one additional apparatus, based on the predetermined location corresponding to the at least one additional apparatus.

5. The apparatus of claim 1, the processing circuitry comprising:
an angle of arrival circuitry to generate the estimate of the angle of arrival corresponding to the signal transmitted from the at least one additional apparatus; and
a received signal strength indication (RSSI) circuitry to calculate an RSSI estimate corresponding to the estimate corresponding to the distance between the apparatus and the at least one additional apparatus.

6. The apparatus of claim 1, the processing circuitry comprising:
an angle of arrival circuitry to generate the estimate of the angle of arrival corresponding to the signal transmitted from the at least one additional apparatus.

7. The apparatus of claim 1, wherein:
the signal having characteristics being compliant with Bluetooth low energy (BLE), Bluetooth basic range/enhanced data rate (BR/EDR), or Institute of Electrical and Electronics Engineers (IEEE) 802.11.

8. The apparatus of claim 1, wherein:
the apparatus being one of a plurality of locating devices;
the at least one additional apparatus being at least one of a plurality of transmitting devices respectively associated with a plurality of locations; and
the plurality of locating devices to generate estimates of respective angles of arrival of respective signals transmitted from the plurality of transmitting devices and respective range estimates corresponding to respective distances between the plurality of transmitting devices and the plurality of locating devices.

9. The apparatus of claim 8, wherein:
the respective angles of arrival and the respective range estimates being employed by a gaming console to monitor movement of at least one of a plurality of transmitting devices respectively associated with a plurality of locations.

10. The apparatus of claim 1, wherein:
the apparatus being a locating device; and
the at least one additional apparatus being a transmitting device implemented within a key fob, a transmitting device associated with a at least one location, a wireless station (STA), or a wireless local area network (WLAN/WiFi) access point (AP).

11. An apparatus, comprising:
a plurality of antennae to receive a signal transmitted from at least one additional apparatus;

a switching mechanism to dwell on each of the plurality of antennae for a respective period of time and to generate a multi-antenna signal there from;

a front-end circuitry, coupled to the switching mechanism, to generate a digital signal based on the multi-antenna signal;

an angle of arrival circuitry, coupled to the front-end circuitry, to generate an estimate of an angle of arrival corresponding to the signal transmitted from the at least one additional apparatus;

a received signal strength indication (RSSI) circuitry, coupled to the front-end circuitry, to calculate an RSSI estimate corresponding to an estimate corresponding to a distance between the apparatus and the at least one additional apparatus; and an operational mode selection circuitry adaptively to direct operation of the front-end circuitry and the processing circuitry in accordance with a first operational mode and a second operational mode; and wherein:

the first operational mode corresponding to the signal including predetermined contents; and the second operational mode corresponding to the signal including unknown contents.

12. The apparatus of claim 11, the front-end circuitry comprising:
a digital packet processing circuitry to identify repetition coded bits within the digital signal and to direct the switching mechanism to switch between two of the plurality of antennae during a selected bit within the repetition coded bits.

13. The apparatus of claim 11, the front-end circuitry comprising:
a digital packet processing circuitry to use the digital signal to identify a media access control (MAC) address corresponding to the at least one additional apparatus; and wherein:
the apparatus to associate the MAC address with a predetermined location corresponding to the at least one additional apparatus; and
the apparatus to estimate a position of the apparatus, relative to the at least one additional apparatus, based on the predetermined location corresponding to the at least one additional apparatus.

14. The apparatus of claim 11, wherein:
the signal having characteristics being compliant with Bluetooth low energy (BLE), Bluetooth basic range/enhanced data rate (BR/EDR), or Institute of Electrical and Electronics Engineers (IEEE) 802.11.

15. The apparatus of claim 11, wherein:
the apparatus being a locating device; and
the at least one additional apparatus being a transmitting device implemented within a key fob, a transmitting device associated with a at least one location, a wireless station (STA), or a wireless local area network (WLAN/WiFi) access point (AP).

16. A method for operating a communication device, comprising:

operating a plurality of antennae for receiving a signal transmitted from at least one additional communication device;

operating a switching mechanism for dwelling on each of the plurality of antennae for a respective period of time and for generating a multi-antenna signal there from;

generating a digital signal based on the multi-antenna signal; and processing the digital signal, in accordance with at least one operational mode, selected from a plurality of operational modes based on at least one characteristic of the signal, thereby generating at least one of an estimate of an angle of arrival corresponding to the signal transmitted from at least one additional communication device and a range estimate corresponding to a distance between the communication device and at least one additional communication device; and adaptively directing operation of the communication device in accordance with a first of the plurality of operational modes and a second operational modes; and wherein:

the first of the plurality of operational modes corresponding to the signal including predetermined contents; and the second of the plurality of operational modes corresponding to the signal including unknown contents.

17. The method of claim 16, further comprising:
identifying repetition coded bits within the digital signal and, based on the repetition coded bits, directing the switching mechanism to switch between two of the plurality of antennae during a selected bit within the repetition coded bits.

18. The method of claim 16, further comprising:
using the digital signal for identifying a media access control (MAC) address corresponding to the at least one additional communication device;
associating the MAC address with a predetermined location corresponding to the at least one additional communication device; and
estimating a position of the communication device, relative to the at least one additional communication device, based on the predetermined location corresponding to the at least one additional communication device.

19. The method of claim 16, further comprising:
calculating an received signal strength indicator (RSSI) estimate corresponding to an estimate corresponding to a distance between the communication device and at least one additional communication device.

20. The method of claim 16, wherein:
the communication device being a locating device; and
the at least one additional communication device being a transmitting device implemented within a key fob, a transmitting device operable to be situated on a person, a wireless station (STA), or a wireless local area network (WLAN/WiFi) access point (AP).

* * * * *

UNITED STATES PATENT AND TRADEMARK OFFICE
CERTIFICATE OF CORRECTION

PATENT NO.        : 8,723,729 B2                                            Page 1 of 1
APPLICATION NO.   : 12/787256
DATED             : May 13, 2014
INVENTOR(S)       : Desai et al.

It is certified that error appears in the above-identified patent and that said Letters Patent is hereby corrected as shown below:

In the Claims

Col. 12, line 62, in claim 10: before "at least one" delete "a"
Col. 13, line 53, in claim 15: before "at least one" delete "a"
Col. 14, line 21, in claim 16: after "a second" insert --of the plurality of--

Signed and Sealed this
Eleventh Day of August, 2015

Michelle K. Lee
*Director of the United States Patent and Trademark Office*